(12) United States Patent
Miao et al.

(10) Patent No.: US 7,575,618 B2
(45) Date of Patent: Aug. 18, 2009

(54) REACTIVE BINDERS FOR POROUS WALL-FLOW FILTERS

(75) Inventors: Weiguo Miao, Corning, NY (US); Jianguo Wang, Horseheads, NY (US)

(73) Assignee: Corning Incorporated, Corning, NY (US)

(*) Notice: Subject to any disclaimer, the term of this patent is extended or adjusted under 35 U.S.C. 154(b) by 533 days.

(21) Appl. No.: 11/394,594

(22) Filed: Mar. 30, 2006

(65) Prior Publication Data
US 2007/0234693 A1    Oct. 11, 2007

(51) Int. Cl.
*B01D 46/00* (2006.01)
*B01D 39/20* (2006.01)

(52) U.S. Cl. .................. 55/523; 55/282.3; 55/385.3; 55/524; 55/DIG. 5; 55/DIG. 10; 55/DIG. 30; 60/299; 60/611; 95/273; 422/180; 428/118; 264/41; 264/44; 264/628; 264/630; 264/631; 264/DIG. 48

(58) Field of Classification Search ............ 55/282.2, 55/282.3, 385.3, 523, 524, DIG. 5, DIG. 10, 55/DIG. 30; 60/299, 311; 422/177, 180; 428/116, 117, 118; 502/439; 264/41, 44, 264/628, 630, 631, DIG. 48; 95/273
See application file for complete search history.

(56) References Cited

U.S. PATENT DOCUMENTS

| | | | |
|---|---|---|---|
| 4,968,467 A * | 11/1990 | Zievers | 55/523 |
| 5,892,049 A * | 4/1999 | Hippel et al. | 502/353 |
| 6,207,101 B1 * | 3/2001 | Beall et al. | 264/630 |
| 6,287,510 B1 * | 9/2001 | Xun | 264/630 |
| 6,372,033 B1 * | 4/2002 | Chalasani et al. | 106/140.1 |
| 6,555,032 B2 * | 4/2003 | Gadkaree | 264/44 |
| 6,773,481 B2 | 8/2004 | Noguchi | 55/523 |
| 6,864,198 B2 | 3/2005 | Merkel | 501/80 |
| 7,276,280 B2 * | 10/2007 | Dinwoodie et al. | 55/523 |
| 2003/0143370 A1 | 7/2003 | Noguchi | 428/116 |
| 2003/0151155 A1 | 8/2003 | Muroi | 264/44 |
| 2004/0029707 A1 | 2/2004 | Beall | 501/119 |
| 2004/0051196 A1 | 3/2004 | Otsuka | 264/41 |
| 2004/0177600 A1 | 9/2004 | Ichikawa | 55/523 |
| 2004/0261384 A1 | 12/2004 | Merkel | 55/523 |
| 2005/0069469 A1 | 3/2005 | Fu | 422/177 |
| 2005/0120690 A1 | 6/2005 | Noguchi | 55/523 |
| 2005/0146066 A1 | 7/2005 | Koide et al. | 264/44 |
| 2005/0191480 A1 * | 9/2005 | Tao et al. | 428/116 |
| 2005/0235622 A1 | 10/2005 | Cutler et al. | 55/523 |
| 2006/0003143 A1 | 1/2006 | Uchida | 428/116 |
| 2006/0021309 A1 * | 2/2006 | Merkel | 55/523 |

OTHER PUBLICATIONS

U.S. Appl. No. 11/699,288, filed Jan. 29, 2007, Weiguo Miao, et al.

* cited by examiner

*Primary Examiner*—Jason M Greene
(74) *Attorney, Agent, or Firm*—Matthew B. McNutt

(57) ABSTRACT

Porous ceramic articles such as ceramic filters are provided from ceramic extrusion batches comprising mixtures of oxides and oxide precursors with a reactive binder system, the binder system comprising a cellulosic temporary binder and two or more reactive binder components such as colloidal alumina, carbohydrate pore formers, reactive high charge density polymers, and chemical cross-linkers, the reactive binder system promoting cross-linking or networking reactions in the batch that enhance the fine pore structures of the porous ceramic products.

6 Claims, 2 Drawing Sheets

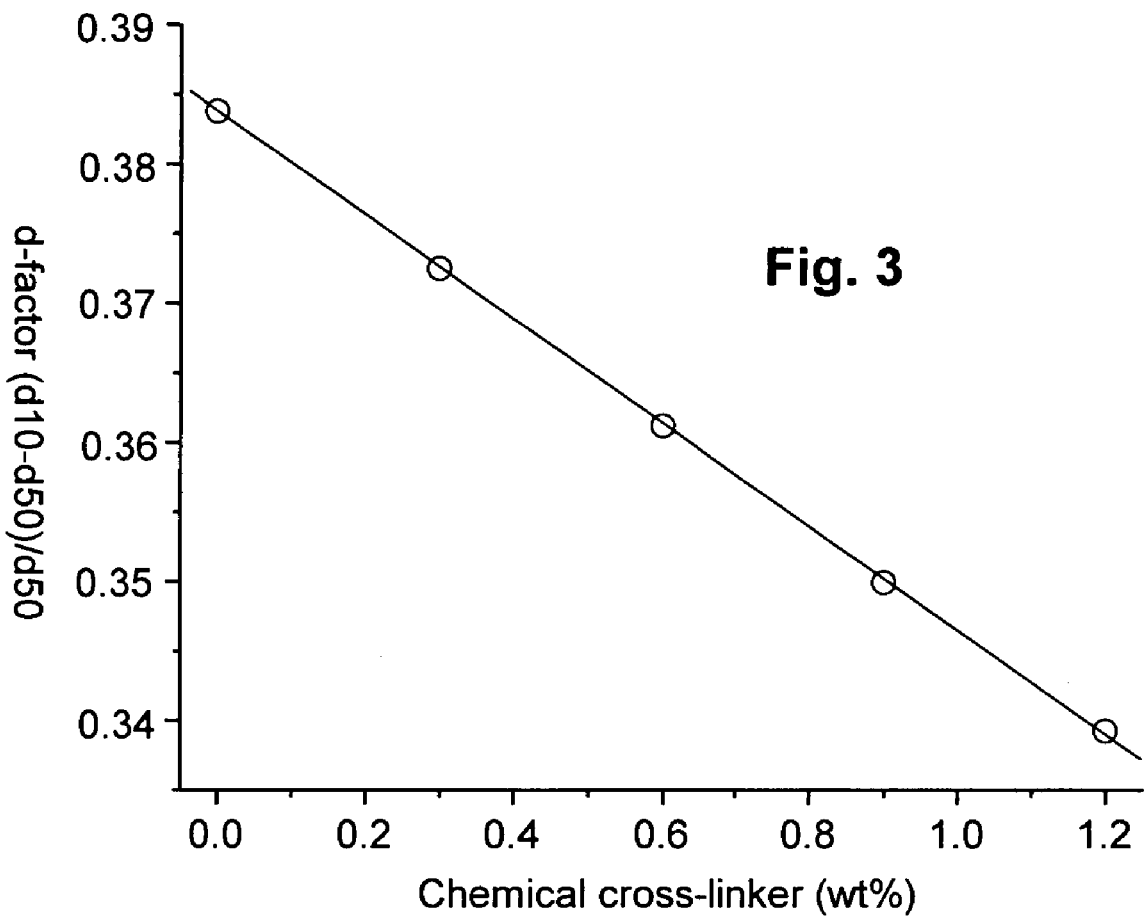

REACTIVE BINDERS FOR POROUS WALL-FLOW FILTERS

BACKGROUND OF THE INVENTION

Porous ceramic filters are used in a variety of applications, particularly where high resistance to chemical attack and/or thermal damage are required. One application of particular interest involves ceramic wall flow filters useful for the treatment of diesel engine exhaust gases. Such filters, termed diesel particulate filters (DPFs), are becoming increasingly important to meet more stringent exhaust emissions regulations limiting the amount of exhaust particulates (soot) that may be emitted by diesel passenger cars and trucks.

One very promising candidate for use in wall flow DPFs is cordierite, a magnesium aluminosilicate material exhibiting good strength and refractoriness, and a sufficiently low coefficient of thermal expansion to demonstrate good resistance to thermal shock damage. However, although many different formulations for porous cordierite ceramics have been developed, obtaining a proper combination of high strength, low thermal expansion, and a controlled pore morphology imparting both good gas permeability and high filtration efficiency remains difficult. Proper porosity is particularly important since low permeability leading to a high filter pressure drop is objectionable from the point of view of engine fuel efficiency and power output. Low pressure drops for both clean filters and for filters carrying significant loadings of trapped soot particulates are required.

A number of strategies have been developed to address these concerns. Published PCT application WO 2005/018790, for example, discloses active filter pretreatments comprising the application of passivating coatings to porous filters prior to the application of active catalyst deposits thereon. The passivating coatings significantly improved the properties of catalyzed DPFs, including filters composed of aluminum titanate as well as cordierite. Certain polymers pre-coated on porous ceramic surfaces were found to undergo ion exchange reactions with catalyst washcoat slurries, improving washcoat homogeneity on the porous surfaces of the filters while preventing washcoat diffusion into microcracks and fine pores in of the filters. Washcoat intrusion had been found to contribute to elastic modulus and thermal expansion increases in the filters and/or to degrade the permeability thereof.

Further improvements in filter performance were achieved in accordance with published PCT application WO 2005/091821, wherein certain thermally cross-linkable polymer solutions, when caused to gel within the filter pore structure, were found to promote the selective catalyst coating of larger pores in preference to smaller pores and microcracks within the ceramic. In consequence, both the catalyst efficiency and the gas permeability of these filters were enhanced.

Notwithstanding these improvements in catalyst coating technology, further improvements in the underlying porous ceramic structure will be needed if further improvements in catalytic wall-flow diesel particulate filter performance are to be realized. Filter performance is dependent on three fundamental properties, i.e., mechanical properties, thermal properties and filtration properties. All of these are dominated by the underlying ceramic structure, in particular the porosity, average pore size, pore size distribution, and pore interconnections that fundamentally affect filter permeability and filter pressure drop in both clean and soot-loaded configurations. While known filters can provide low clean pressure drops, low soot-loaded pressure drops, and low coefficients of thermal expansion, there remains a need in the art for a filter and method of making it wherein both reduced pressure drops and low thermal expansion coefficients would be secured.

SUMMARY OF THE INVENTION

The present invention provides fundamental improvements in the pore morphologies of porous ceramics useful for the fabrication of refractory thermal shock resistant wall flow filters, particularly including cordierite filters but also extending to other families of reaction-sintered microcracked ceramics such as the aluminum titanates. These improvements, manifested in the low thermal expansions and low exhaust gas pressure drops of the filters, are realized through the use of novel ceramic batch compositions that employ a highly reactive organic-inorganic binder (nanobinder) system. Further, the use of the reactive binder strategy of the invention does not adversely impact other critical filter properties or processing parameters, such as filter strength, filter thermal shock resistance, or filter drying and firing processes. Filter pressure drop improvements of 20-30% or more can be realized.

Traditional ceramic compositions used for the extrusion of green ceramic honeycombs for wall flow filter production employ what are basically physical mixtures of individual batch components: oxides, compound oxides, pore formers such as starches or graphites, temporary organic binders such as the cellulose ethers, surfactants and/or wetting agents, and vehicles such as water. The interactions occurring among these various constituents during mixing and drying are thought to be quite limited.

While not intending to be bound by theory, it is thought that green ceramic honeycombs formed using reactive binder formulations in accordance with the invention exist in the form of a covalently bonded interpenetrating network among the inorganic ceramics and organic pore formers. Using these types of binder formulations, interactions between individual batch components can provide improvements in all phases of ceramic honeycomb production, i.e., mixing, extrusion, drying, and firing. In consequence, the final thermal, mechanical and filtration properties of the fired products such as porous filter products can all be significantly improved.

In a first aspect, then, the invention provides a method of manufacturing a porous ceramic article of high flexural strength, a low thermal expansion coefficient, and controlled pore size and pore size distribution. In accordance with that method a ceramic extrusion batch is first compounded, that batch comprising a base batch component, a reactive binder component (reactive binder system), and an aqueous vehicle. The base batch component comprises a mixture of oxides and oxide precursors that will react together at high temperatures to produce one or more refractory ceramic oxide phases. The reactive binder component comprises a cellulose ether temporary binder and at least two other active binder constituents selected from the group of: (i) colloidal aluminas, such as surface-charged alumina colloids, (ii) carbohydrate pore formers, such as starches, (iii) reactive high-charge-density linear polymer binders such as ionenes; and (iv) chemical cross-linkers. These reactive binder constituents have been found to act as promoters of cross-linking or networking reactions in the batch that are considered to favorably impact the final microstructure of porous ceramic product.

After the batch has been compounded, it is plasticized by mixing, formed into a ceramic perform, and then heated to dry the preform through the removal of unbound water therefrom. It is during this heating that extensive interactions among at least the constituents of the reactive binder can occur. Thus, for example, the reactive high-charge-density linear polymer binder can interact extensively with at least the carbohydrate pore former and the nanometer-sized alumina particles present in the surface-charged alumina colloid, aiding in the above-described beneficial cross-linking or networking of the organic and in some cases the inorganic components of the batch.

Finally, the dried ceramic preform thus provided is fired to remove residual reactive binder components and water therefrom and to react the mixture of oxides and oxide precursors present in the preform to develop the final porous ceramic. The product of this firing is a porous ceramic article of low thermal expansion and high strength wherein the described cross-linking or networking provide a pore structure of uniform pore morphology and high pore interconnectivity. These properties are important, for example, in combustion exhaust gas applications wherein both high filtration efficiency and low filter pressure drop are required.

In a second aspect, the invention provides a porous ceramic article useful, for example, to fabricate ceramic particulate filters. The porous ceramic article provided in accordance with the invention will typically exhibit an average linear coefficient of thermal expansion in the range of $1-7 \times 10^{-7}/°C.$ over the temperature range from room temperature (RT) to 800° C., a porosity in the range of 45-55%, a mean pore size in the range of 17-22 μm; and a pore size distribution, as between small and intermediate pores, characterized by a porosity d-factor not exceeding 0.4 as calculated from the d-factor expression $[(d50-d10)/d50]$. When configured as a wall-flow filter structure of conventional geometry these porosity characteristics can provide filters exhibiting a gas pressure drop in clean (soot-free) condition not exceeding 2.2 kPa as measured under standard gas flow conditions, and a pressure drop in a typical soot-loaded condition that will not exceed about 6.4 kPa when similarly tested. This combination of properties is of particular value in the manufacture of combustion engine exhaust filters.

DESCRIPTION OF THE DRAWINGS

The invention is further described below with reference to the appended drawings, wherein:

FIG. 3 illustrates the effects of chemical cross-linking reactive binder additions on the pore size distributions of porous ceramic articles made in accordance with the invention.

DETAILED DESCRIPTION

In traditional batching systems for the manufacture of ceramics via reaction sintering there is little chemical interaction between the reactive binder components and the base batch components of the batch. The base batch components ordinarily react only at high temperatures and after the removal of reactive binder components, and the latter typically undergo little interaction with each other or with the inorganics during the batch mixing and drying steps of manufacture. Thus the dried greenware is generally a simple physical mixture of inorganic and reactive binder components.

The use of reactive binder components in accordance with the invention affects the manufacturing process in a number of ways. In the presence of a linking reactive organic binder component, for example, the organics and inorganics may interact with each other via cross-linking at temperatures significantly below sintering temperatures, and the organics may react extensively with each other during the mixing and drying stages of the process. Thus the dried greenware may encompass chemically bonded networks incorporating both inorganic and reactive binder components of the system.

The extent to which the thermal expansion and pore morphology of porous ceramic articles provided in accordance with the invention can be beneficially modified depends not only on the presence of reactive binders in the batch, but also upon the presence or absence of other batch constituents that can modify or increase the extent of crosslinking or networking during heat treatment. Chains of reactions promoted by these reactive binders that are postulated to occur among a number of the required and optional batch constituents include: (a) surface modifications of some of the ceramic particles through interactions with the reactive binders; (b) the dispersion of the reactive binders through the addition of reactive polymer dispersing agents; to improve; (c) enhanced interactions between the polymer dispersing agents and the reactive binders through the addition of reactive surfactants; (d) crosslinking reactions among the pore formers and polymer dispersing agents; and (e) crosslinking reactions between surfactants and pore formers. The product of these interactions would then be a covalently bonded interpenetrating network (IPN) of inorganic particles, reactive organic binders, organic pore formers and polymer surfactants.

Figure 1:
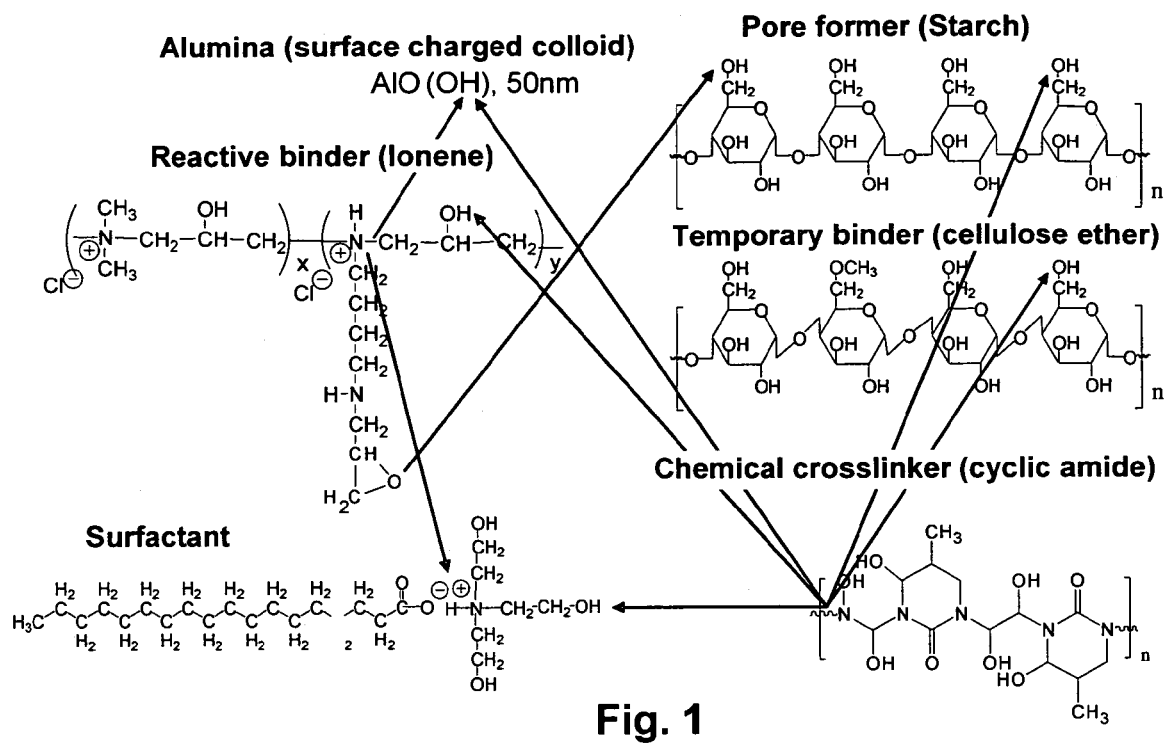
FIG. 1 diagramatically illustrates cross-linking interactions taking place among batch components provided in ceramic powder batches in accordance with the invention.

FIG. 1 of the drawings illustrates some of the interactions that can occur among the various constituents that may be present in batches in accordance with the invention. Thus, as indicated by the arrows in FIG. 1, cross-linking can occur (i) between reactive high-charge-density linear polymer binders such as ionene and colloidal aluminas, pore formers (e.g. starches), surfactants, and cross-linkers such as cyclic amides; (ii) between cross-linkers and surfactants; and (iii) between cross-linkers and both starch pore formers and cellulose ether temporary binders.

The reactive polymer binders are among the batch components most importantly contributing to the favorable properties of the final porous ceramic products. Preferred among such reactive binder components are the so-called ionene polymers, i.e. a group of high-charge-density linear polymers that avoid both excessive hydrophobicity and high solubility in aqueous batch vehicles. These polymers are characterized by the presence of dimethylammonium charge centers interconnected by alternating alkyl chain segments containing x and y methylene groups. Most preferred are the water soluble linear ionene polymers incorporating regular quaternary ammonium groups associated with chloride counter-ions that impart high charge density to the polymer chain, beneficially affecting interactions with both inorganic batch components and many of the organic binder constituents of the batch.

Also strongly influencing batch cross-linking behavior is nature of the alumina present in the batch. Colloidal aluminas, more particularly colloidal hydrous aluminas such as the boehmites and pseudo-boehmites, can interact strongly with both the reactive binders and any chemical cross-linkers present in the batch, in that respecting being properly characterized as part of the reactive binder (nanobinder) system. Such aluminas can help to form oxide-binder domains that appear to enhance pore inter-connectivity, as the result of which gas pressure drops across ceramic wall structures formed of these materials can be reduced without adversely affecting the thermal expansion characteristics of the ceramics.

Surfactants that can be used in ceramic powder batches of the kinds herein described include ionic or non-ionic surfactants, although ionic surfactants and particularly cationic surfactants are more commonly used. Many cationic surfactants are known, including many based on quaternary ammonium cations such as cetyl trimethylammonium bromide, alkyltrimethylammonium salts, cetyl pyridinium chloride, polyethoxylated tallow amines, and benzalkonium chloride. Temporary cellulosic binders such as the cellulose ethers, e.g. methyl cellulose and hydroxyl propyl methyl cellulose, are known binders for these ceramic extrusion batches and are compatible with the reactive polymer binders and chemical cross-linkers as well.

Among the chemical cross-linkers that can be used are the melamine and polycycloamide cross-linkers. However, other chemical cross-linkers that are effective to cross-link carbohydrate pore formers such as starches can be used as well.

The results of the various crosslinking reactions that can occur during the mixing and subsequent heating of ceramic powder batches comprising reactive binders are several. Among the observed effects have been (i) an increase in surface interactions between organic/organic, organic/inorganic, and inorganic/inorganic materials that can improve the extrusion stability and yield of the plasticized batches; (ii) low temperature inorganic interactions with the high surface area reactive binders that can significantly reduce firing times by increasing the intermediate strengths of the reacting ceramics; (iii) further interactions with the reactive binders that can improve the final strengths of the porous ceramic products; (iv) polymer network crosslinking involving the reactive binders and ceramic particles that promote fewer crystal nucleation sites at lower temperatures, resulting in larger crystal orientation domains during the crystallization process that can reduce fired ceramic CTE values; (iv) reactions between organic and inorganic system components that provide a more uniform pore size distribution, imparting higher catalytic efficiency to catalyzed ceramic parts; and (v) better pore connectivity resulting from pore former-binder interactions, thereby reducing flowing gas pressure drops across porous ceramic filters.

Table 1 below sets forth some representative compositions for cordierite batch formulations both inside and outside of the scope of the present invention, including compositions comprising reactive binder components in accordance with selected embodiments of the invention and compositions substantially free of such additions. All of the compositions shown are based on a common clay-talc-alumina batch (the clay/talc base) comprising talc, raw kaolin clay, alpha alumina, aluminum trihydrate, silica, a sodium stearate lubricant, and a methyl cellulose temporary binder. In accordance with well-known practice, the clay, talc and alumina are included in that base batch in proportions that will, in combination with any colloidal alumina binder component employed, yield cordierite ($2MgO.2Al_2O_3.5SiO_2$) as the principal crystalline phase of the fired porous ceramic products.

For batches such as reported in Table 1, a suitable starch component is potato starch, and an effective alumina colloid is Nyacol® Al-20 colloidal alumina dispersion commercially available from Nyacol Nano Technologies, Ashland, Mass. A suitable cross-linker is Berset® 2506 or Berset® 2700 cross-linker, sold by Bercen Inc., Cranson, R.I. The reactive linear polymer binder component is commercially available as PC 1194 coagulant, a dispersion of the polymer poly[(dimethylimino)(2-hydroxy-1,3-propanediyl) chloride], from GE Betz specialty chemicals of Trevose, Pa, USA. Plasticized powder batches incorporating these constituents and suitable for extrusion into honeycomb preforms can be prepared in accordance with known practice, for example by dry-blending the clay, talc, alumina, starch, and other components together until well mixed, and then adding the liquid alumina, cross-linker and linear polymer binder components to the batch together with sufficient water to form a uniform plasticized mass for extrusion.

TABLE 1

Reactive Batch Compositions

| Sample ID. | clay/talc base | Starch | Alumina Colloid | Cross-linker | Reactive Linear Polymer Binder |
|---|---|---|---|---|---|
| CL-1 | 80.0% | 0.0% (20% C) | 0.0% | 0.00% | 0.00% |
| CL-2 | 100.0% | 0.0% | 0.0% | 0.00% | 0.00% |
| A | 90.0% | 10.0% | 0.0% | 0.00% | 0.00% |
| B | 90.0% | 10.0% | 0.0% | 0.00% | 0.23% |
| C | 90.0% | 10.0% | 0.0% | 0.00% | 0.50% |
| D | 90.0% | 10.0% | 0.0% | 0.00% | 1.00% |
| F | 98.5% | 0.0% | 1.5% | 0.00% | 0.00% |
| G | 97.0% | 0.0% | 3.0% | 0.00% | 0.00% |
| H | 95.0% | 0.0% | 5.0% | 0.00% | 0.00% |
| I | 90.0% | 10.0% | 0.0% | 0.33% | 0.00% |
| J | 89.0% | 10.0% | 0.0% | 0.65% | 0.00% |
| K | 89.0% | 10.0% | 0.0% | 1.00% | 0.00% |

Representative thermal expansion, porosity, and pressure drop properties for porous cordierite ceramics prepared from batches such as shown in Table 1 by drying and firing extruded green honeycombs to convert the clay, talc and alumina constituents thereof into cordierite are reported below in Table 2—Porous Ceramic Properties. The average coefficients of thermal expansion (CTEs) for the honeycombs are conventionally determined on cut bar samples and reported as average thermal expansion values per ° C. over the temperature range RT-800° C. Porosity and pore size measurements are made by standard mercury intrusion porosimetry measurements, with the mean pore size (termed d50 in Table 4) of the ceramic products corresponding to the pore size at which 50% intrusion of the total open pore volume of the ceramic by liquid mercury is reached. The d-factors reported in Table 4, being relative measures of the size relationship between the small pore sizes and the mean pore sizes in each of the fired porous ceramics, is calculated from the expression [d-factor=(d50-d10)/d50], wherein d10 corresponds to the pore diameter below which the last 10% (volume) of mercury intrusion occurs during mercury porosimetry testing.

The clean pressure drops (ΔP-clean) reported in Table 2 and elsewhere in this description are gas pressure drops in kilopascals across porous wall flow test filters of a standard configuration (5.66-inch diameter by ×6-inch length right circular cylindrical honeycombs with equal inlet and outlet channel volumes and having a honeycomb cell density of 200 cells/in$^2$ transverse to the cylinder axis and a channel wall thickness of 0.017 inches). The pressure drops are measured at an air flow rate of 250 cfm (7.08 m$^3$/min) through the test filters. The soot-loaded pressure drops (ΔP-5 g/L) are the gas pressure drops measured across the same test filters under the same gas flow conditions, but with artificial soot being present within the sample filters at a test soot loading of 5 grams of soot per liter of honeycomb cylinder volume.

TABLE 2

Porous Ceramic Properties

| Sample ID. | Porosity (%) | d50 (um) | d-factor | CTE (×10⁻⁷/° C.) | ΔP- Clean (kPa) | ΔP –5 g/L (kPa) |
|---|---|---|---|---|---|---|
| CL-1 | 51 | 13.2 | 0.69 | 6.1 | | |
| CL-2 | 43.2 | 14.3 | 0.43 | 4.2 | 2.5 | 7.7 |
| A | 54.5 | 19.6 | 0.4 | 5.1 | 1.97 | 5.6 |
| B | 54.4 | 20.3 | 0.39 | 4.7 | 1.94 | 5.4 |
| C | 54.1 | 20.8 | 0.38 | 4.1 | 1.9 | 5.1 |
| D | 53.5 | 21.7 | 0.36 | 3.8 | 1.87 | 5 |
| F | 42.4 | 13.7 | 0.42 | 3.1 | 2.6 | 7.9 |
| G | 41.5 | 13.2 | 0.42 | 2.4 | 2.6 | 8.2 |
| H | 40.3 | 12.8 | 0.4 | 1.5 | 2.8 | 8.4 |
| I | 54.5 | 19.9 | 0.39 | 5.5 | 1.99 | 5.7 |
| J | 54.3 | 20.1 | 0.38 | 5.9 | 2.02 | 5.7 |
| K | 54.1 | 20.3 | 0.37 | 6.1 | 2.04 | 5.8 |

The product enhancements that can be secured through the use of reactive binder components can be seen from the data in Table 2. Examples CL-1 and CL-2 correspond in composition and properties to two commercially available (prior art) ceramics sold in the form of wall flow diesel exhaust particulate filters, those compositions being free of reactive binder components. Ceramics of these types are in some cases relatively high in thermal expansion and in other cases relatively low in porosity. Further, they generally exhibit somewhat low average pore sizes and relatively high d-factors.

The addition of only a colloidal alumina reactive binder component, as illustrated in examples F, G and H in Table 1, can produce significant reductions in thermal expansion coefficient, as has been previously reported for other cordierite batch systems comprising colloidal alumina additions. However, notwithstanding the reactivity of these aluminas, the extent of crosslinking, in the absence of any other reactive binder constituent such as a carbohydrate pore former, reactive polymer, or chemical cross-linker, is thought to be limited, and in fact the average pore sizes of those products remain relatively low and the d-factors remain relatively high.

In contrast to the commercial and alumina-colloid-beneficiated batches shown in Table 1, significant increases in average pore size and reductions in d-factor are shown in the case of Examples A, B, C and D from Table 1. The addition of the starch pore former alone, as shown in Example A, has recently been shown to improve pore size distributions as well as increase porosity in cordierite ceramics. However, combining the starch addition with additions of a reactive polymer binder as in Examples B, C and D brings substantial further improvements in ceramic properties, apparently due to enhanced binder cross-linking and networking of organic and inorganic batch constituents during the mixing and/or drying stages of ceramic manufacture. Hence these combined additions simultaneously reduce the d-factor, CTE, clean pressure drop, and soot-loaded pressure drop of the products, and in all cases without adversely affecting the percent porosity and average pore size of the ceramic material. Similar improvements in the d-factor, CTE, clean pressure drop and soot-loaded pressure drop of ceramic test filters over, for example, a filter of ceramic CL-2 composition, are seen when combining the carbohydrate pore former (starch) with a chemical cross-linker to form the reactive binder system. Examples I, J and K reflect the enhancements possible with that cross-linking combination.

While considerable improvements in thermal expansion and pore size distribution may be achieved through the use of only small additions of only selected ones of the reactive binder constituents as disclosed in Tables 1 and 2 above, it is found that increasing the concentration and/or number of reactive binder components can achieve product enhancements not attainable with fewer component additions. Thus, with three or even four reactive binder components present in the same batch, the number of interactions among the organics and inorganics increases significantly, thereby increasing the extent of cross-linking and thus the formation of chemically bonded networks that can occur during the manufacture of the products.

Table 3 below sets forth examples of compositions for cordierite batch formulations comprising more complex reactive binder systems in accordance with the invention. Again, all of the compositions shown are based on a common clay-talc-alumina batch (the clay/talc base) comprising talc, raw kaolin clay, alpha alumina, aluminum trihydrate, silica, a sodium stearate lubricant, and a methyl cellulose temporary binder, these again being present in proportions that will yield cordierite ($2MgO \cdot 2Al_2O_3 \cdot 5SiO_2$) as the principal crystalline phase of the fired products.

As was the case for the Table 1 batches, a suitable starch addition to the batch is potato starch, an effective alumina colloid is Nyacol® Al-20 colloidal alumina dispersion, and the cross-linker is again Berset® 2506 or Berset® 2700 cross-linker, sold by Bercen Inc., Cranson, R.I. The same reactive linear polymer binder component, i.e., the polymer commercially available as PC 1194 coagulant, a dispersion of the polymer poly[(dimethylimino)(2-hydroxy-1,3-propanediyl) chloride], from GE Betz specialty chemicals of Trevose, Pa., USA, is useful in these mixtures.

TABLE 3

Reactive Batch Compositions

| Sample No. | clay/talc base | Starch | Alumina Colloid | Cross-linker | Reactive Linear Polymer Binder |
|---|---|---|---|---|---|
| 1 | 87.52% | 9.57% | 1.50% | 1.30% | 0.12% |
| 2 | 87.91% | 10.89% | 0.81% | 0.33% | 0.06% |
| 3 | 90.68% | 8.12% | 0.81% | 0.33% | 0.06% |
| 4 | 86.97% | 8.51% | 3.00% | 1.30% | 0.23% |
| 5 | 86.45% | 10.49% | 1.91% | 0.98% | 0.17% |
| 6 | 91.20% | 6.54% | 1.50% | 0.65% | 0.12% |
| 7 | 88.93% | 6.54% | 3.00% | 1.30% | 0.23% |
| 8 | 89.17% | 8.12% | 1.56% | 0.98% | 0.17% |
| 9 | 88.53% | 9.51% | 0.81% | 0.98% | 0.17% |
| 10 | 85.00% | 12.09% | 1.36% | 1.30% | 0.23% |

Representative thermal expansion, porosity, and pressure drop properties for porous cordierite ceramics prepared from batches such as shown in Table 3 by drying and firing extruded green honeycombs to convert the clay, talc and alumina constituents thereof into cordierite are reported below in Table 4—Porous Ceramic Properties. As in the case of Table 2, the average coefficients of thermal expansion (CTEs) for the honeycombs are conventionally determined on cut bar samples and reported as average thermal expansion values per ° C. over the temperature range RT-800° C. Porosity and pore size measurements are made by standard mercury intrusion porosimetry measurements, with the results being reported on the same basis as the data presented in Table 2. Similarly, the clean pressure drops (ΔP-clean) and soot-loaded pressure drops (ΔP-5 g/L) reported in Table 4 are gas pressure drops in kilopascals across porous wall flow test filters of a standard configuration utilizing the same test conditions as reported above for Table 2.

TABLE 4

Porous Ceramic Properties

| Sample No. | Porosity (%) | d50 (um) | d-factor | CTE ($\times 10^{-7}/°$ C.) | $\Delta$P-clean (kPa) | $\Delta$P –5 g/L (kPa) |
|---|---|---|---|---|---|---|
| 1 | 53.48 | 21.18 | 0.34 | 5.6 | 2.06 | 5.81 |
| 2 | 53.67 | 20.16 | 0.35 | 4.4 | 2.09 | 5.78 |
| 3 | 50.95 | 18.12 | 0.38 | 4.6 | 2.08 | 6.04 |
| 4 | 49.33 | 19.57 | 0.33 | 1.9 | 1.96 | 5.66 |
| 5 | 51.76 | 19.96 | 0.33 | 4.6 | 2.05 | 5.94 |
| 6 | 50.65 | 19.13 | 0.38 | 4.5 | 1.98 | 5.66 |
| 7 | 49.35 | 18.53 | 0.35 | 3.3 | 1.95 | 5.95 |
| 8 | 52.28 | 20.16 | 0.35 | 6.9 | 2.06 | 5.93 |
| 9 | 52.51 | 21.02 | 0.34 | 5.1 | 2.10 | 6.21 |
| 10 | 53.14 | 20.24 | 0.38 | 5.9 | 1.95 | 5.43 |

Figure 2:
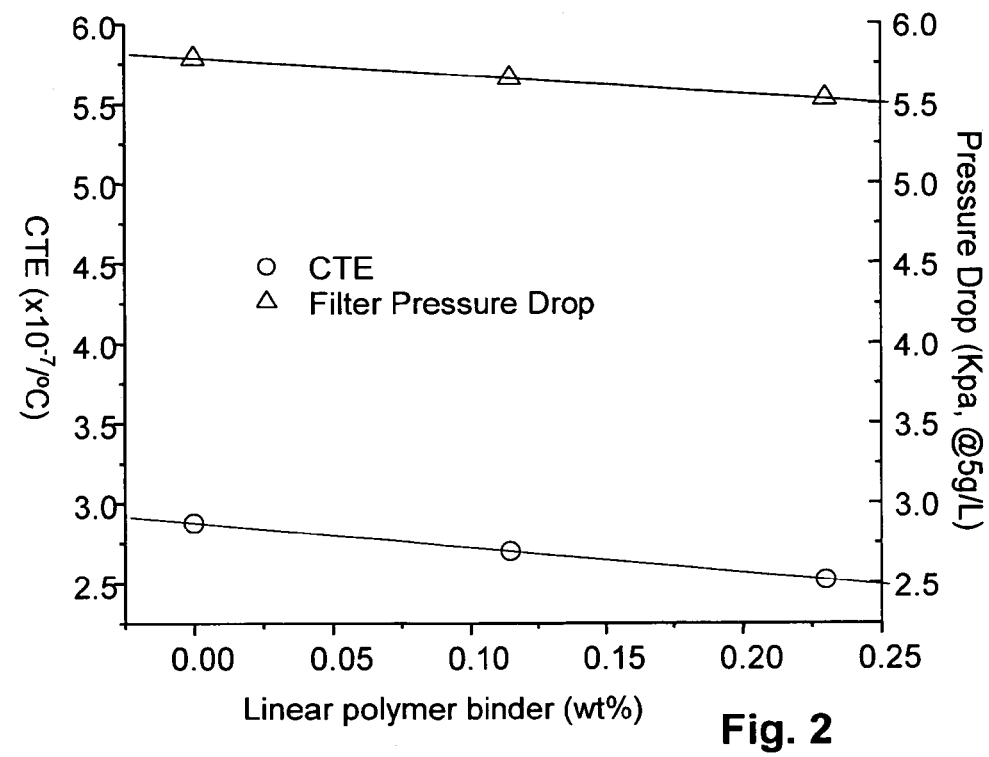
FIG. 2 illustrates the beneficial effects of reactive high-charge-density linear polymer binder additions on the thermal expansion and gas pressure drop characteristics of ceramic wall-flow filters made in accordance with the invention.

The effects of reactive binder system batch composition variations on the key properties of fired porous ceramic products are significant. FIG. 2 of the drawings, for example, illustrates the effects of reactive linear polymer binder (e.g., ionene) concentration on (i) the average linear coefficients of thermal expansion (CTE), and (ii) the soot-loaded pressure drops ($\Delta$P) of a series of fired cordierite porous ceramic samples made from batches incorporating 10% (wt) of a starch pore former and 3% (wt) of a colloidal alumina inorganic binder. Over the range of reactive polymer binder concentrations shown, useful reductions in both thermal expansion (CTE) and soot-loaded filter pressure drops ($\Delta$P) result from increasing concentrations of the reactive polymer binder in the batch.

FIG. 3 of the drawings illustrates the effects of chemical cross-linker concentration (weight percent) on the pore size distributions of the resulting fired ceramics in batches such as reported in Table 3. The effects illustrated in FIG. 3 are representative of those seen in batches comprising 10% (wt) of a starch pore former, 3% (wt) of a colloidal alumina inorganic binder, and 0.23% (wt) of an ionene reactive binder. As set forth above and as illustrated in FIG. 1 of the drawings, these cross-linkers participate actively in cross-linking with carbohydrate pore formers such as starches, as well as with reactive linear polymer binders, temporary cellulosic binders, and colloidal alumina reactive binder components.

For engine exhaust filtration applications, porous ceramics having pore size distributions characterized by lower d-factors [(d50-d10)/d50] are more likely to exhibit lower soot-loaded pressure drops than those with pore size distributions characterized by higher d-factors, and for that purpose are generally preferred. Porous cordierite ceramics with d-factors below 0.4 can readily be provided from ceramic batches incorporating these reactive binder systems, and are particularly good candidates for engine emissions control systems. Nevertheless, chemical cross-linkers can exhibit a tendency to increase the average coefficients of thermal expansion of the fired ceramics in cordierite ceramic systems, and are therefore best used in combination with starch pore formers and colloidal alumina binder components that tend to reduce those coefficients.

Embodiments of the invention that are particularly well suited for the production of diesel engine exhaust filters will desirably fall within a range of physical properties and performance characteristics that include a porosity of 51-55%, a mean pore size d50 in the range of 17-20 um, a d-factor [(d50-d10)/d50] in the range of 0.35-0.39, an average CTE (RT-800° C.) in the range of $2-5 \times 10^{-7}/°$ C., a clean filter pressure drop in the range of 1-2 kPa when measured on a standard filter as above described, and a soot-loaded pressure drop (5 g/liter of trapped soot) in the range of 4-5.6 kPa.

Ceramic powder batches for porous cordierite ceramics that are suitable for the production of wall flow filters offering effective particulate filtration include those wherein the base batch component constitutes 83-93% by weight of the extrusion batch, exclusive of the aqueous vehicle, and includes kaolin clay, talc, and alumina constituents in proportions that will yield a predominant crystalline phase of cordierite upon firing. The reactive reactive binder component of such batches will comprise, in weight percent of the batch exclusive of the aqueous vehicle, 6-13% of a carbohydrate pore-former, 0.5-4% of a colloidal alumina suspension; 0.10-0.30% of a reactive high-charge-density linear polymer binder, and 0-2% of a chemical cross-linker.

Meeting still more stringent CTE, porosity, and pressure drop requirements for diesel engine exhaust filters is best achieved in batches wherein the base batch component constitutes 86-89% by weight of the extrusion batch exclusive of the aqueous vehicle, and wherein the reactive binder component includes 8-10% of a starch carbohydrate pore former, and 2-3% of a colloidal alumina suspension. The reactive linear polymer binder will preferably consist of an ionene polymer in a proportion of 0.2-0.3% by weight of the batch, and 0.1-0.5% of a chemical cross-linker will be included.

Of course the foregoing examples of porous ceramic products, filters, and ceramic batches are merely illustrative of the invention as it may be practiced within the scope of the appended claims.

We claim:

1. A method of manufacturing a porous ceramic article comprising the steps of:
    compounding a ceramic extrusion batch comprising a base batch component, a reactive binder component, and an aqueous vehicle,
        the base batch component comprising inorganic constituents selected from the group consisting of oxides, compound oxides, metal compounds and mixtures thereof that react at high temperatures to produce a refractory ceramic oxide phase;
        the reactive binder component comprising a cellulose ether temporary binder and at least two other active binder constituents selected from the group of: (i) colloidal aluminas, (ii) carbohydrate pore formers, (iii) reactive high-charge-density linear binders, and (iv) chemical cross-linkers;
    plasticizing and forming the extrusion batch into a ceramic preform;
    heating the ceramic preform to initiate cross-linking reactions among the constituents of the reactive binder component and to remove water from the preform to provide a dried ceramic preform; and
    firing the dried ceramic preform to form a porous ceramic article from which the temporary binder, reactive binder, and carbohydrate pore former have been removed.

2. A method in accordance with claim 1 wherein the reactive binder component comprises at least a cellulose ether temporary binder, a surface-charged alumina colloid; at least one carbohydrate pore former, and at least one reactive high-charge-density linear polymer binder.

3. A method of manufacturing a porous ceramic article comprising the steps of:
    compounding a ceramic extrusion batch comprising a base batch component, a reactive binder component, and an aqueous vehicle,
        the base batch component constituting 83-93% by weight of the extrusion batch exclusive of the aqueous vehicle and comprises kaolin clay, talc, and alumina constituents in proportions that will yield a predominant crystalline phase of cordierite upon firing;

the reactive binder component comprising, in weight percent of the batch exclusive of the aqueous vehicle, 6-13% of at least one carbohydrate pore-former; 0.5-4% of a colloidal alumina suspension; 0.10-0.30% of at least one reactive high-charge-density linear polymer binder, and 0-2% of a chemical cross-linker;

plasticizing and forming the extrusion batch into a ceramic preform;

heating the ceramic preform to initiate cross-linking reactions among the constituents of the reactive binder component and to remove water from the preform to provide a dried ceramic preform; and firing the dried ceramic preform to form a porous ceramic article from which the temporary binder, reactive binder, and carbohydrate pore former have been removed.

4. A method in accordance with claim 3 wherein:

the base batch component constitutes 86-89% by weight of the extrusion batch exclusive of the aqueous vehicle, and the reactive binder component includes 8-10% of a starch carbohydrate pore former; 2-3% of a colloidal alumina suspension, 0.2-0.3% of an ionene reactive polymer binder, and 0.1-0.5% of a chemical cross-linker.

5. A porous cordierite ceramic wall flow filter having:

an average linear coefficient of thermal expansion (RT-800° C.) in the range of $1\text{-}7\times10^{-7}/°$ C.;

a porosity in the range of 45-55%;

a mean pore size in the range of 17-22 μm;

a porosity d-factor [(d50-d10)/d50] not exceeding 0.4;

a clean pressure drop not exceeding 2.2 kPa at an air flow rate of 250 cfm; and a soot-loaded pressure drop not exceeding 6.5 kPa at an air flow rate of 250 cfm.

6. A porous cordierite ceramic wall flow filter in accordance with claim 4 having an average CTE (RT-800° C.) in the range of $2\text{-}5\times10^{31}$ $^7/°$ C., a porosity in the range of 51-55%, a mean pore size d50 in the range of 17-20 um, a d-factor [(d50-d10)/d50] in the range of 0.35-0.39, a clean filter pressure drop in the range of 1-2 kPa at an air flow rate of 250 cfm, and a soot-loaded pressure drop in the range of 4-5.6 kPa at an air flow rate of 250 cfm.

* * * * *

UNITED STATES PATENT AND TRADEMARK OFFICE
CERTIFICATE OF CORRECTION

PATENT NO. : 7,575,618 B2 Page 1 of 1
APPLICATION NO. : 11/394594
DATED : August 18, 2009
INVENTOR(S) : Weiguo Miao et al.

It is certified that error appears in the above-identified patent and that said Letters Patent is hereby corrected as shown below:

| Col. | Line | Description |
|---|---|---|
| 10 | 45 | "linear binders" should be -- linear polymer binders --. |
| 12 | 16 | "2-5 × $10^{31}$ $^7$/°C" should be -- 2-5 × $10^{-7}$/°C --. |

Signed and Sealed this

Fourth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,575,618 B2 Page 1 of 1
APPLICATION NO. : 11/394594
DATED : August 18, 2009
INVENTOR(S) : Miao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,575,618 B2  Page 1 of 1
APPLICATION NO. : 11/394594
DATED : August 18, 2009
INVENTOR(S) : Weiguo Miao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 674 days.

Signed and Sealed this

Fifth Day of October, 2010

David J. Kappos
*Director of the United States Patent and Trademark Office*